United States Patent Office 3,082,365
Patented Mar. 19, 1963

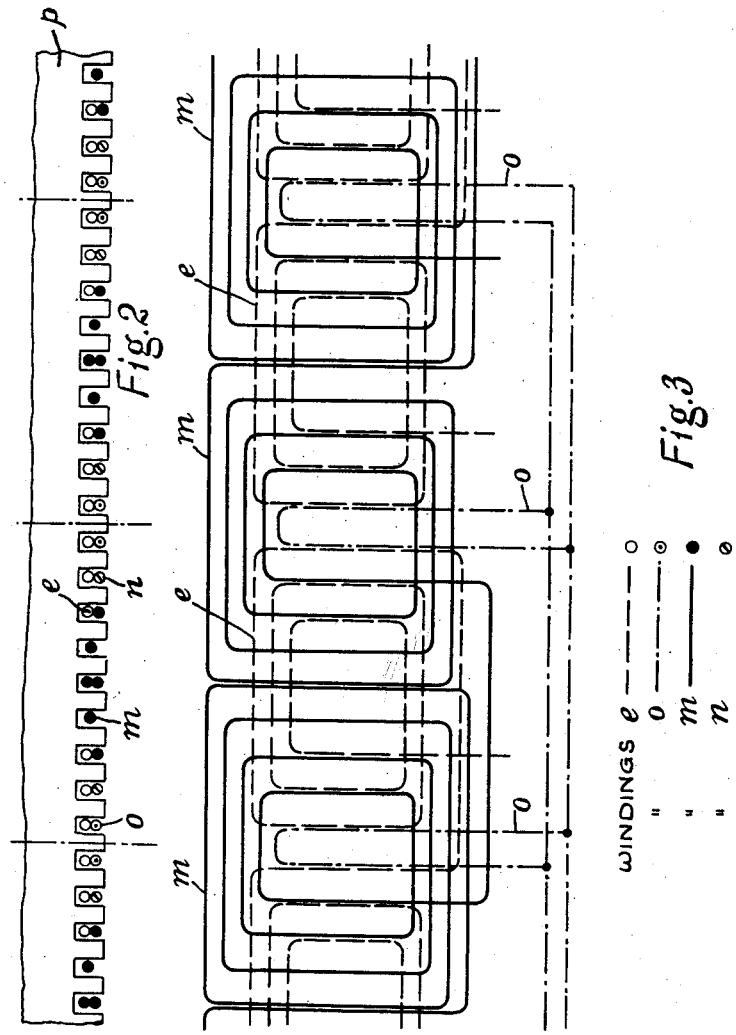

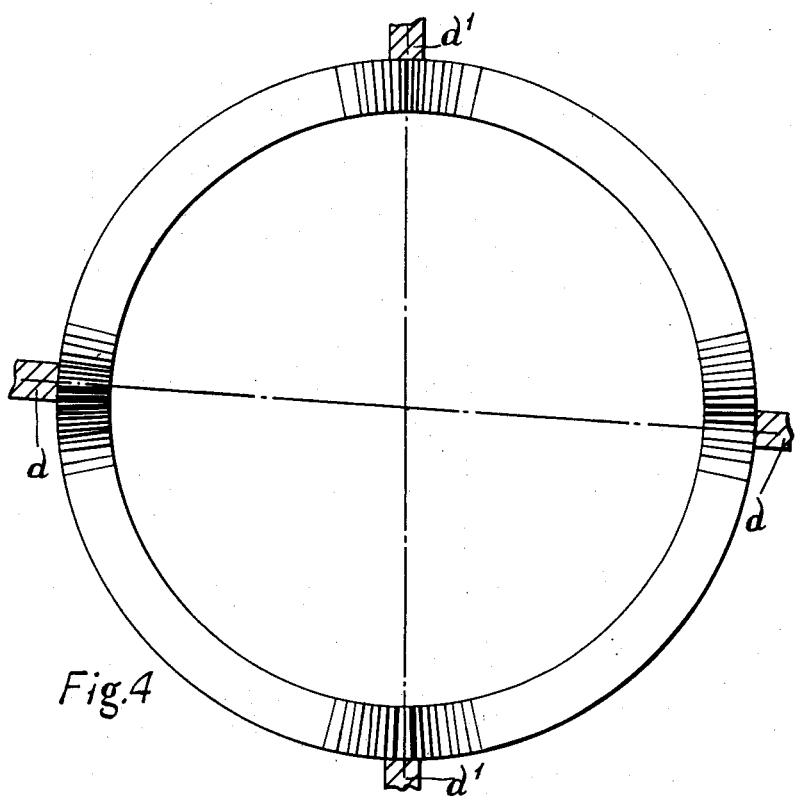

3,082,365
SINGLE-PHASE OR LIKE ALTERNATING
CURRENT ELECTRIC MOTORS
Thomas Mensforth, 8 The Sanctuary, Westminster,
London, England
Filed Dec. 22, 1958, Ser. No. 782,129
Claims priority, application Great Britain Jan. 15, 1958
4 Claims. (Cl. 318—244)

This invention relates to single-phase or like alternating current electric motors of the commutator type having the field windings and armature in separate circuits, and having shunt and regenerative characteristics. The object of the invention is to enable efficient operation to be obtained over a usefully wide range of speed variation.

The invention consists in an arrangement wherein (a) the yield system of a motor of the said type includes a field exciting winding and a winding for neutralising the armature reaction, (b) the armature has a resistor interposed between each commutator segment and the armature winding for improving comutation and for minimising distortion of the field system resulting from transformer voltages in the winding between the commutator segments short-circuited by brushes, and (c) means in the circuit of the exciting field winding to maintain the field current substantially in phase with the mains supply voltage applied to the armature.

In particular the invention consists of a motor as defined in the preceding paragraph which also includes (a) shunt commutating pole windings and series commutating pole windings in series with and forming part of the neutralising windings incorporated with the field system, and (b) means for automatically controlling the exciting field current.

In the accompanying drawings:

FIGURE 2 is a developed view illustrating the slots in the inner periphery of the stator and the disposition of the field and other associated windings in the said slots.

FIGURE 3 is a diagram illustrating the field and other associated windings.

FIGURE 4 is a diagram illustrating the commutator and an arrangement of the associated brushes.

Figure 1:
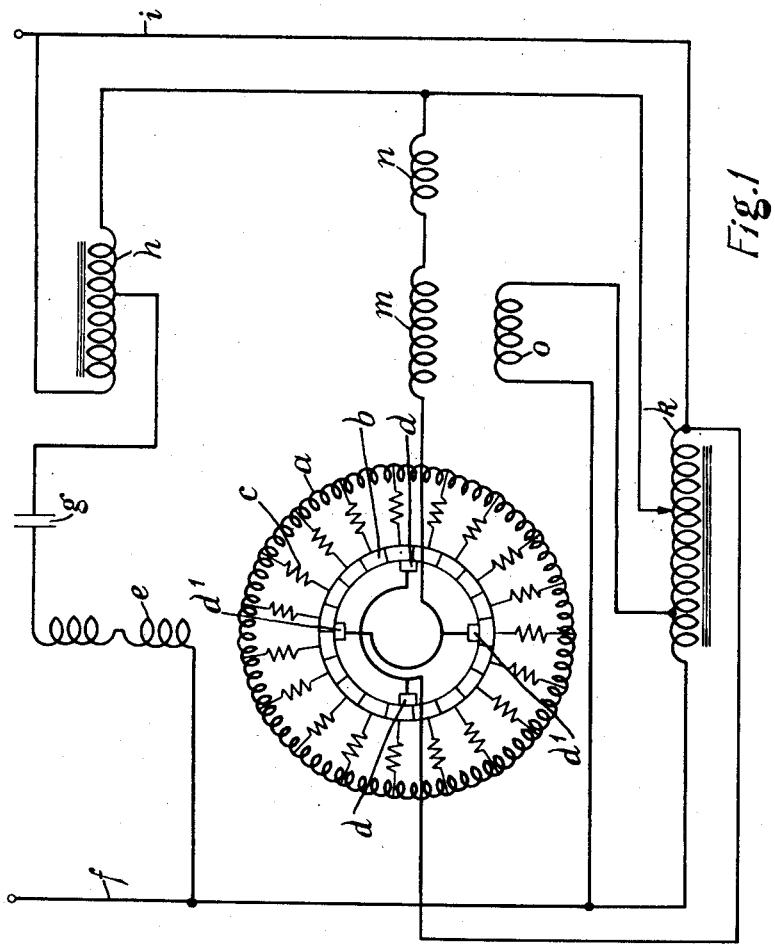
FIGURE 1 illustrates diagrammatically a motor embodying the invention.

Referring to FIGURE 1, the rotary armature comprises a winding $a$ of the wave-wound type, and a commutator consisting of an assembly of segments $b$. Each segment $b$ is connected by a resistor $c$ to a point on the winding $a$, the points of connection between the resistors and the winding being equally spaced. The purpose of the resistors is to improve commutation and minimise distortion of the exciting field.

In contact with the commutator are arranged at least one pair of brushes $d$, $d^1$. Alternatively and preferably, two brushes $d$ are provided, these being disposed at 180° apart and interconnected as shown. Likewise two brushes $d^1$ are provided, these also being disposed at 180° apart and interconnected as shown. The pairs of brushes $d$, $d^1$ may be arranged at 90° apart, but they may be differently disposed as will be described later with reference to FIGURE 4.

The field system comprises a principal exciting winding $e$ to one end of which current is supplied from the power line $f$. The other end of this winding is connected through a series capacitor $g$ to a point on an auto-transformer $h$ which at one end is connected to a line $i$ which may be the neutral line of the power supply system. The other end of this transformer is connected to the movable point of a variable voltage transformer $k$ which latter is connected at its ends to the power line $f$, $i$.

Alternatively a resistor may be provided in series with the capactior $g$. The effect of the capacitor (and resistor) and the auto-transformer is to maintain the current in, and the flux of, the exciting field winding substantially constant and in phase with the power supply voltage, and also to maintain the back E.M.F. in true opposition to the supply voltage.

In addition the field system includes a neutralising winding $m$ connected in series with the commutator brushes $d^1$, and in series with the winding $m$ is connected a series commutating winding $n$ which latter is connected to one end of the auto-transformer $h$ and the movable point of the voltage transformer $k$ as shown in the drawing.

Further the field system includes a shunt commutating winding $o$ which is connected at its ends to the power line $f$ and a point on the variable voltage transformer $k$. The purpose of the neutralising winding $m$ is to neutralise the armature reaction, and the purpose of the commutating windings $n$, $o$ is to enable improved commutation to be obtained at the brushes.

An example of the invention will now be described as applied to a motor of 1.5 horse-power to be supplied with single phase alternating current at 240 volt, having a frequency of 50 cycles per second, the motor being adapted to rotate at any speed in either direction up to a maximum of 3,000 revolutions per minute.

The field system comprises an annular iron stator which is represented in a developed form by $p$ in FIGURE 2. The stator is slotted around its inner periphery to form four poles each having nine teeth. The internal diameter of the stator is 5.5 inches and the external diameter is 9 inches, the axial width of the stator being 2.75 inches. Each pole includes 9 slots as shown in FIGURE 2. The windings are arranged as shown in FIGURES 2 and 3. The exciting winding $e$ is arranged to provide 187 turns on each pole, these being made from copper wire of 0.245 square millimetre in cross-sectional area. This winding is accommodated in 6 slots in each pole, and is distributed in 83 turns embracing 8 teeth, 83 turns embracing 6 teeth and 21 turns embracing 4 teeth. The neutralising winding $m$ consists of 53 turns made of copper wire having a cross-sectional area of 2.94 square millimetres, and is accommodated in 8 slots in each pole, providing 212 turns in series. The shunt commutating winding $o$ consists of 450 turns made from copper wire having a cross-sectional area of 0.0937 square millimetre and wound around one tooth between each pair of adjacent poles. The series commutating winding $n$ consists of 13 turns made from copper wire having a cross-sectional area of 2.94 square millimetres, wound around three adjacent teeth between each pair of adjacent poles.

The armature is slotted to form 25 slots and the simple wave-winding $a$ therein has 625 turns made from copper wire having a cross-sectional area of 0.98 square millimetre.

The commutator as represented by FIGURE 4 comprises 125 segments, and each is connected to the associated winding $a$ by a resistor $c$ of 1.04 ohms as above described with reference to FIGURE 1. Also four brushes $d$, $d$, $d^1$, $d^1$ are provided. The brushes $d$, $d$ are disposed on a centre line which is inclined at an angle which is slightly less than a right angle relatively to the centre line through the brushes $d^1$, as shown in FIGURE 4. The thickness of each brush is made such that it spans not more than two segments. Also the disposition of the brushes is such that when at any given instant a brush spans a pair of segments, the other brushes span the whole of one segment and parts of the two adjacent segments as shown in FIGURE 4, in order to minimise circulatory currents in the assoicated windings $a$.

The capacitor $g$ in series with the exciting winding $e$ has a capacity of approximately 9 microfarads, and the associated auto-transformer $h$ is adapted in conjunction with the variable voltage transformer $k$ to reduce the voltage applied to the exciting field winding in proportion to increase of voltage applied to the armature when the speed is increased, thereby maintaining substantially constant the flux associated with the exciting windings $e$.

The shunt commutating windings $o$ on the four poles of the stator are connected in parallel to a 45 volt tapping on the voltage transformer $k$.

Variation of speed of the armature is effected by adjusting the output voltage of the variable voltage transformer $k$. Reversal of direction of rotation is effected by known means adapted to reverse the direction of current supply to the field winding, or alternately to the armature and the shunt commutating winding.

The invention is not, however, limited to the specific example above described, but in all cases the same essential features are employed and adapted to suit motors of other sizes or ranges of speed variation.

Having thus described my invention what I claim as new and desire to secure by Letters Patent is:

1. A variable speed single-phase or like alternating current motor having shunt characteristics which includes essentially (a) an armature circuit adapted to be impressed by an alternating current voltage and including an armature, associated winding, commutator segments and brushes, a resistor connected in series between the armature winding and each commutator segment for improving commutation and minimising distortion of the field by transformer voltages in parts of the armature winding between the commutator segments short-circuited by the brushes, and a winding for neutralising armature reaction, (b) a field exciting winding constructed and arranged to produce magnetic flux through the armature, (c) means for maintaining the current in and flux of the field exciting winding automatically substantially in phase with the supply voltage applied to the armature circuit comprising, an auto-transformer said field exciting winding being connected between an intermediate tap of the auto-transformer and one terminal of an alternating current supply voltage through a serially connected capacitor, speed adjustable control means for simultaneously deriving from said supply voltage two voltages varying in amplitude in opposite directions and applying them to the terminals of the auto-transformer and to the armature, respectively, to vary the voltage applied to the field exciting winding in a direction opposite to that of the voltage applied to the armature.

2. A motor as claimed in claim 1, including two commutating windings, one in series and the other in shunt with the field exciting winding.

3. A motor as claimed in claim 2, in which the said control means consists of a variable voltage transformer adapted to be impressed by alternating current voltage from the supply voltage and connected electrically from different points intermediate its ends to the auto-transformer, the series commutating winding and the shunt commutating winding.

4. A motor as claimed in claim 1, including an assembly of commutator brushes spaced around the commutator axis, the angular spacing of the said brushes being such that short-circuiting of the associated armature winding is minimised.

References Cited in the file of this patent

UNITED STATES PATENTS

| | | |
|---|---|---|
| 298,955 | Edison | May 20, 1884 |
| 1,953,129 | Powers | Apr. 3, 1934 |
| 2,192,050 | Norcross | Feb. 27, 1940 |
| 2,379,867 | Conrad | July 10, 1945 |